(12) United States Patent
Liu et al.

(10) Patent No.: US 7,916,924 B2
(45) Date of Patent: Mar. 29, 2011

(54) COLOR PROCESSING METHOD FOR IDENTIFICATION OF AREAS WITHIN AN IMAGE CORRESPONDING TO MONETARY BANKNOTES

(75) Inventors: Xu-Hua Liu, Los Angeles, CA (US); Byung-Tae Oh, Los Angeles, CA (US); Young-Min Kwak, Gardena, CA (US); Chung-Chieh Kuo, Taipei (TW); Ying-Jieh Huang, Taipei County (TW)

(73) Assignee: Primax Electronics Ltd., Neihu, Taipei (TW)

( * ) Notice: Subject to any disclaimer, the term of this patent is extended or adjusted under 35 U.S.C. 154(b) by 1226 days.

(21) Appl. No.: 11/533,356

(22) Filed: Sep. 19, 2006

(65) Prior Publication Data
US 2008/0069423 A1  Mar. 20, 2008

(51) Int. Cl.
*G06K 9/00* (2006.01)
(52) U.S. Cl. ........................................ 382/135
(58) Field of Classification Search .......... 382/128, 382/135–140, 164, 165, 100
See application file for complete search history.

(56) References Cited

U.S. PATENT DOCUMENTS

| | | |
|---|---|---|
| 5,533,144 A | 7/1996 | Fan |
| 5,638,496 A | 6/1997 | Sato |
| 6,026,186 A | 2/2000 | Fan |
| 6,067,374 A | 5/2000 | Fan et al. |
| 6,181,813 B1 | 1/2001 | Fan et al. |
| 6,256,412 B1 | 7/2001 | Miyazawa et al. |
| 6,317,524 B1 | 11/2001 | Wu et al. |
| 6,343,204 B1 | 1/2002 | Yang |
| 6,473,202 B1 | 10/2002 | Kanata |
| 6,515,764 B1 | 2/2003 | Knox et al. |
| 6,516,078 B1 | 2/2003 | Yang et al. |
| 6,542,629 B1 | 4/2003 | Wu et al. |
| 6,574,366 B1 | 6/2003 | Fan |
| 6,580,820 B1 | 6/2003 | Fan |
| 6,731,784 B2 | 5/2004 | Yang |
| RE38,716 E | 3/2005 | Caspi |
| 2002/0146167 A1* | 10/2002 | Imamura et al. ............ 382/164 |
| 2004/0247169 A1* | 12/2004 | Ross et al. ................. 382/137 |
| 2005/0100204 A1* | 5/2005 | Afzal et al. ................ 382/135 |

* cited by examiner

*Primary Examiner* — Vu Le
*Assistant Examiner* — Claire Wang
(74) *Attorney, Agent, or Firm* — Winston Hsu; Scott Margo (57) ABSTRACT

A color processing method for identification of areas within an image corresponding to monetary banknotes includes dividing the image into a plurality of sections; extracting color histogram data for each section; assigning a color vector for each section according to the color histogram data for the section; comparing the color vector for each section to a color lookup table to determine a probability of the section corresponding to monetary banknotes; and selecting probable sections having the probability exceeding a first predetermined threshold.

20 Claims, 11 Drawing Sheets

COLOR PROCESSING METHOD FOR IDENTIFICATION OF AREAS WITHIN AN IMAGE CORRESPONDING TO MONETARY BANKNOTES

BACKGROUND OF THE INVENTION

1. Field of the Invention

The present invention relates to image processing, more particularly, to a color processing method for identification of areas within an image corresponding to monetary banknotes.

2. Description of the Prior Art

Automated identification and verification of known currency bills is a practical application when applied to retail and business environments. Electronic verification of known bill types helps to increase security in monetary transactions, and also prevents vendors from receiving counterfeited currencies. Currency detectors available today typically scan an image of a sample currency, from which a series of tests is performed in order to determine the validity of the sample. The tests used can include the identification of known currency sections or landmarks, holograms, reflective areas, printing patterns, or texture patterns.

However, with advancements and availability of printing technologies, the occurrence of counterfeit, or illegally copied currency has increased. Counterfeiters nowadays have access to sophisticated equipment and methods to duplicate known currencies that are virtually indistinguishable to the human eye and touch.

In addition to the increasing difficulties in identifying legitimate currency bills, is the desire to scan sample currencies from images that are larger than the sample currency being scanned. Doing this will allow a bill (or multiple bills) to be scanned with any common scanner, while possibly allowing the scanning and identification of multiple bills at once. However, doing this introduces more problems as the bills may be presented on arbitrary backgrounds, and may have variations in shift and rotation. Many currency detectors today generally only scan one bill at a time, and only scan the immediate area of the bill in order to omit the need to consider the background, rotation, and alignment of the bill.

Additionally, if the note is scanned while embedded with a complicated image background, it may be very difficult to distinguish the actual note from the image background. The image background may also provide additional noise and/or patterns to complicate the detection process and introduce irregularities and errors.

It is needless to say that without the proper identification of a currency note from its image background, while having various offsets and rotations, optimal conditions for accurate counterfeit currency detection cannot be met.

SUMMARY OF THE INVENTION

One objective of the claimed invention is therefore to provide a method of identification of areas within an image that correspond to monetary banknotes, to solve the above-mentioned problems.

According to an exemplary embodiment of the claimed invention, a color processing method is disclosed for identification of areas within an image corresponding to monetary banknotes. The method comprises dividing the image into a plurality of sections; extracting color histogram data for each section; assigning a color vector for each section according to the color histogram data for the section; comparing the color vector for each section to a color lookup table to determine a probability of the section corresponding to monetary banknotes; and selecting probable sections having the probability exceeding a first predetermined threshold.

These and other objectives of the present invention will no doubt become obvious to those of ordinary skill in the art after reading the following detailed description of the preferred embodiment that is illustrated in the various figures and drawings.

DETAILED DESCRIPTION

The present invention therefore provides a color processing method for identification of areas within an image corresponding to monetary banknotes. In the preferred embodiment, the image is derived from a scan containing a monetary banknote of a known currency type. This can include US denomination currencies, Japanese denomination notes, and so forth. The method can be applied for use in the detection of counterfeit currency. The image can be provided with an arbitrary rotational axis and shift alignment. Additionally, the image can contain the monetary banknote while superimposed onto an arbitrary background, can include multiple isolated and independent banknotes, or have overlapping banknotes within the image. The method can be used in conjunction with basic stand-alone scanners, copiers, stand-alone printers, and other related detection and scanning hardware.

The color processing method described by the present invention makes use of new innovations not taught by the prior art. This not only provides an increased means of security measures, but also provides ease of integration with common hardware devices, as well as a viable low cost approach. Various levels of color processing, post-color processing, and statistical-probabilistic analysis are incorporated in this multifaceted procedure. Accurate detection rates, and low false alarm rates can therefore be attained. It is also robust and flexible enough to be applied to different image types and conditions. Additionally, through the use of color analysis, the scanned image can contain the banknote in a shift and rotational invariant manner.

Prior to a concise description of the present invention color processing method, it is important to understand that certain terms used throughout the following description and claims will refer to particular processes or steps. As one skilled in the art will appreciate, designers may refer to such processes by different names. This document does not intend to distinguish between items that differ in name but not function. In the following discussion and in the claims, the terms "including" and "comprising" are used in an open-ended fashion, and thus should be interpreted to mean "including, but not limited to . . . ".

An overview of a color processing method for identification of areas within an image corresponding to monetary banknotes according to an exemplary embodiment of the present invention is illustrated with reference to FIG. 1. The method 100 comprises two main functional steps, a section level approach 110, and a pixel level approach 120. The section level approach 110 performs analysis utilizing a greater scale for a more macroscopic examination of the image. This allows for lower computational cost while determining critical areas for the following pixel level stages. The section level approach 110 contains the sub-processes single level examination 112, and surrounding section examination 114. Both sub-processes 112, 114 make use of a color lookup table 116 for referencing sections under examination. A detailed description of the section level approach 110, as well as sub-processes 112, 114 and color lookup table 116, will be discussed shortly.

The pixel level approach 120 takes the output of the section level approach 110 and performs a more microscopic (pixel level) examination of the sections determined though the section level approach 110. The pixel level approach 120 includes the main process step of pixel level examination 122, utilizing a pixel lookup table 124 for referencing pixels under examination. A detailed description of the pixel level approach, pixel level examination 122 and pixel lookup table 124 will follow later.

1. Section Level Approach

Figure 1:
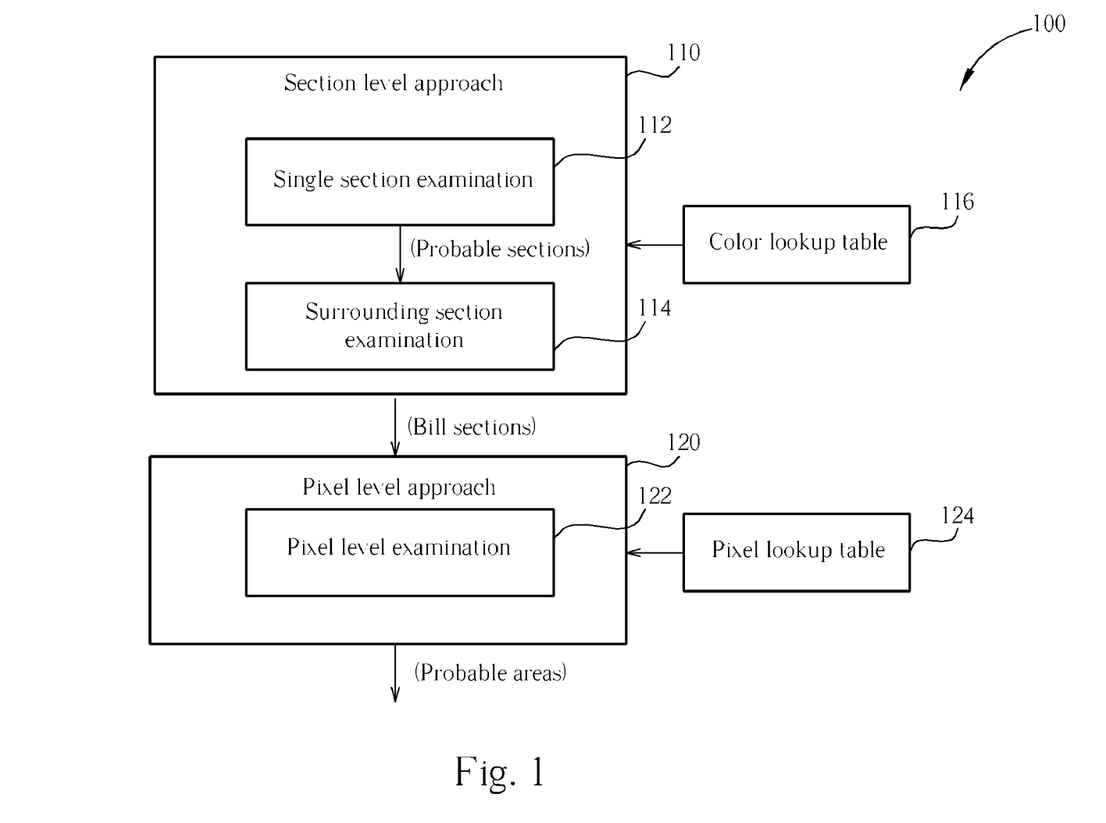
FIG. 1 is an exemplary embodiment illustrating a section level approach and pixel level approach implemented by an exemplary embodiment of the present invention.

As illustrated in FIG. 1, the first step of the color processing method 100 comprises a section level approach 100. An arbitrary image is scanned by a relevant hardware device, digitized and applied to the method 100. It is a goal of the method to determine if the scanned image comprises a monetary banknote of a certain predetermined type and currency.

1.1 Single Section Examination

The first part of the section level approach 110 comprises single section examination 112. The scanned image is divided into a plurality of sections, which will be analyzed. Initial division of the image into macroscopic sections allows for lower computational costs in determining valid and invalid sections of the image which may correspond to the banknote in question.

Figure 2:
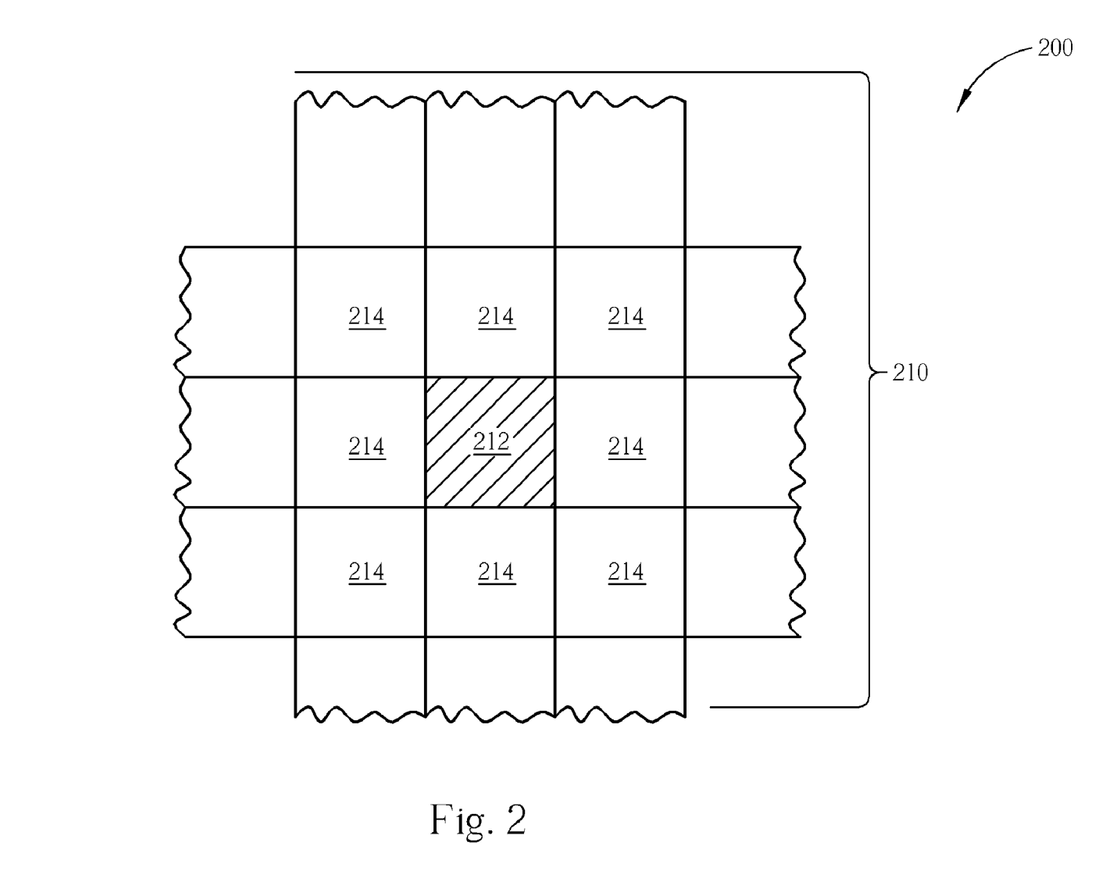
FIG. 2 is a diagram illustrating division of an image into sections, including a probable section and surrounding sections according to an exemplary embodiment of the present invention.
Figure 11:
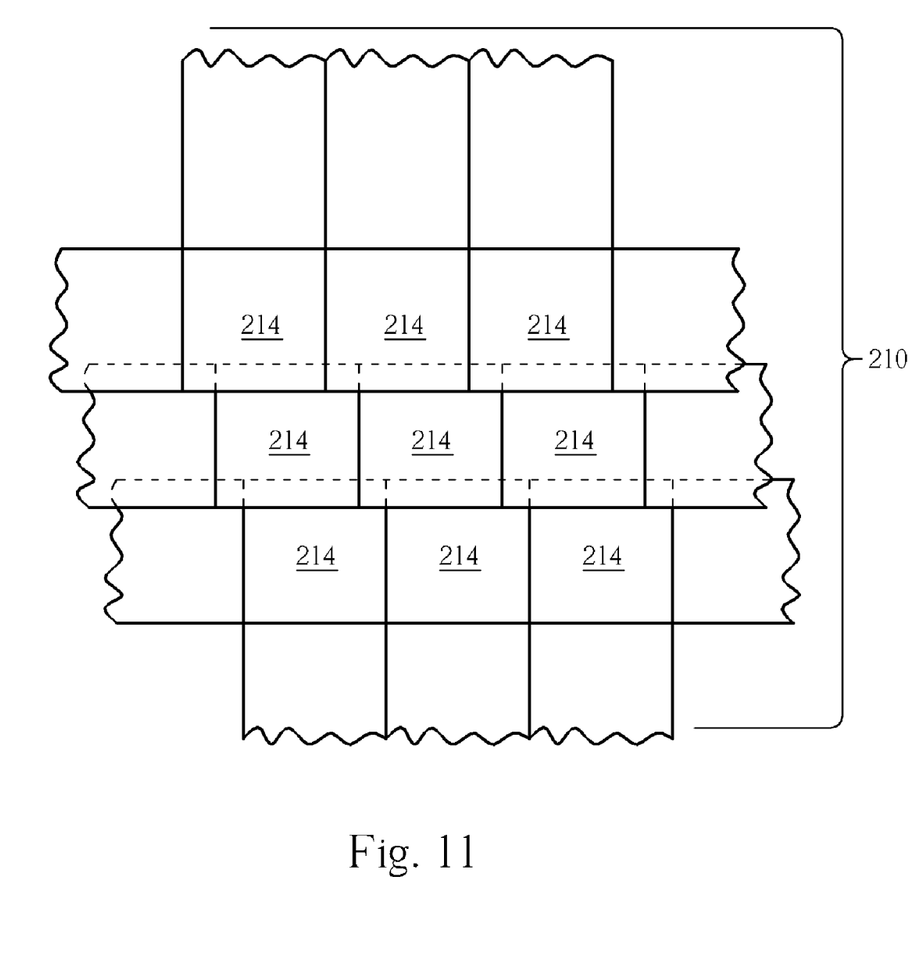
FIG. 11 is a diagram illustrating division of an image into overlapping sections according to an exemplary embodiment of the present invention.

In the preferred embodiment, a plurality of sections 210 are in fact a plurality of blocks arranged in a grid-like manner, as illustrated in FIG. 2. However, other embodiments may employ different geometric shapes, which serve the equal purpose of dividing the image for initial macroscopic examination. The sections may also be isolated, fitted, overlapping, or disjoint. For example, as illustrated in FIG. 11, the sections 210 are implemented as overlapping blocks 214. In general, the present invention is not limited to the shape, format or precise configuration of the plurality sections used, as it is equally applicable in all combinations and permutations.

Figure 3:
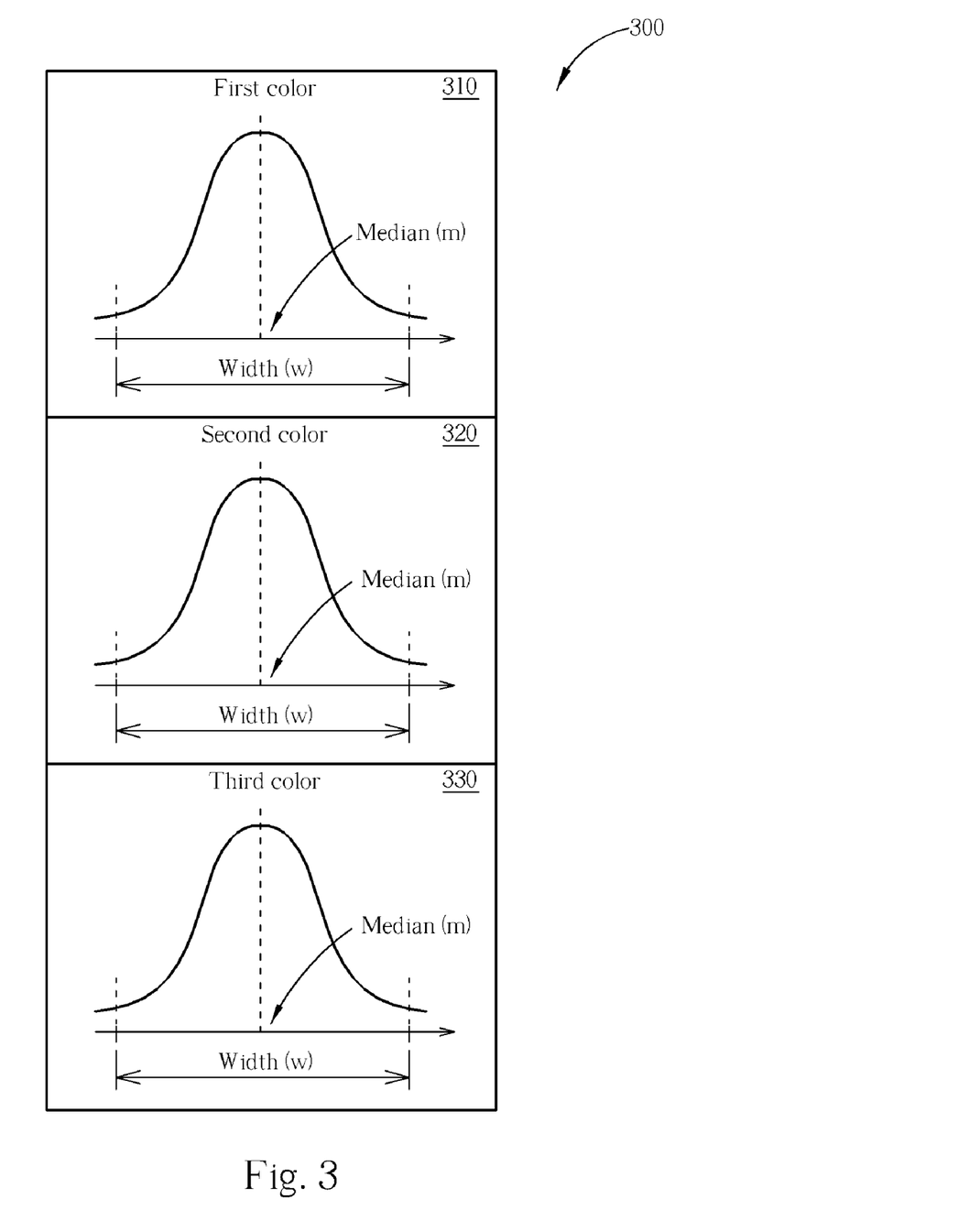
FIG. 3 is a diagram illustrating the extraction of color histogram data for a first color channel, a second color channel, and a third color channel of one section in FIG. 2.

Once divided into sections, color histogram data is then extracted for each section. A color histogram is a representation of an image derived by counting the color type of each pixel in computer graphics. This is illustrated in FIG. 3. Color histograms usually have a normal distribution (bell curve), with a median value, and a width value. The median value indexes the location of the peak of the curve, while the width defines a percentage of enclosed area within the curve. Color histograms can have a color space of any dimension. One preferred embodiment employs a three dimensional color space having a first color 310, a second color 320 and a third color 330, from which the median and width values can be extracted for each color. An example of such a color space can include a red (i.e., the first color in FIG. 3), green (i.e., the second color in FIG. 3), and blue (i.e., the third color in FIG. 3) (RGB) color histogram. As properties of color histograms are well known to those involved in the related art, further discussion is omitted for brevity.

With color histogram data extracted for each section, a color vector can then be constructed for each section according to the extracted data. The color vector provides a convenient representation of color information for each section for computer processing. One preferred embodiment utilizes a six dimensional space vector to summarize key data points extracted from the color histogram of the section. The color vector of this embodiment is described below as:

color vector [width of $1^{st}$ color] [width of $2^{nd}$ color] [width of $3^{rd}$ color] [median of $1^{st}$ color]

[median of $1^{st}$ color—median of $2^{nd}$ color] [median of $1^{st}$ color—median of $3^{rd}$ color]

The use of differences between median values in the $5^{th}$ and $6^{th}$ array is to reduce total memory space constraints. When using RGB histograms, it is noted that the median values are within a local proximity to each other. If required, the median values of the $2^{nd}$ and $3^{rd}$ colors can be extracted from the above when the median of the $1^{st}$ color is known.

With a color vector now defined for each section in the plurality of sections, each color vector is then compared to a color lookup table to determine a probability of the section corresponding to a valid monetary banknote. The probability that the section corresponds to monetary banknotes is calculated according to the frequency of occurrence in the lookup table The color lookup table is created by dividing an image of a valid monetary banknote into a number of sections. Again, the sections can be isolated, independent, or overlapping according to the specific embodiment of the present invention similar to as shown in FIG. 2 and FIG. 11, respectively. The configuration of the sections can also have shift or rotational variations according to a desired training format for the color lookup table, with multiple levels of mapping also possible.

Color histogram data is then extracted for each section of the valid monetary banknote, with a color vector assigned for each section of the valid monetary banknote based on the respective color histogram data. A frequency of occurrence is then counted for each assigned color vector of the valid monetary banknote.

If the probability of the section corresponding to monetary banknotes exceeds a first predetermined threshold, it is then selected a probable section. This step is repeated for all sections until their status as a probable section has been confirmed. Therefore, at this stage, probable sections are merely sections having a color vector with an acceptable frequency of occurrence in correspondence with the valid monetary banknote.

1.2 Surrounding Section Examination

The next part of the section level approach 110 following single section examination 112 is surrounding section examination 114. The surrounding section examination 114 is a more global approach of the first single section examination 112 step. Using the probability information from the previous step 112, probabilities of surrounding sections to each probable section are examined.

First, a comparison of color vectors for surrounding sections of each probable section is performed, with reference to the color lookup table. An average probability for the surrounding sections corresponding to monetary banknotes is then determined. Similar to the previous step, the average probability for the surrounding sections corresponding to monetary banknotes is calculated according to the frequency of occurrence of the surrounding section color vectors in the lookup table. If the average probability is greater than a second predetermined threshold, then the corresponding probable section is selected as a bill section for use in the next step.

FIG. 2 is used to provide an illustrative example for this step. In this embodiment, the probable section is identified as the center section 212. Surrounding sections 214 encompass the center section 212. The color vectors identified for the surrounding sections 214 are compared against the color lookup table 116 to determine an average probability for the surrounding sections corresponding to monetary banknotes. If the average probability is greater than the second predetermined threshold, then the probable section 212 is selected as a bill section.

Although FIG. 2 illustrates the surrounding sections 214 forming a circumference outside of the probable section 212, variations and alternate embodiments may illustrate different configurations, which still obey the teachings of the present invention. For example, the surrounding sections can be arranged in an overlapping, rotational, disjoint, offset, or shifted manner. In all such cases, the present invention method is equally applicable to maintain its desired functional goals.

2. Pixel Level Approach

Once bill sections are determined in the previous step, a pixel level approach 120 is implemented to examine pixels within each bill section. This is performed in the pixel level examination 122 step. The main purpose of this step is to check whether most of the pixels come from the same type of banknote. Pixels contained within the bill sections are compared with a pixel lookup table 124 to determine matching pixels. Matching pixels are defined according to the frequency of occurrence of the color histogram data of the pixels in the pixel lookup table. If matching pixels are discovered within a bill section, the method acts to record the location of the matching pixels on a color process map, defining probable areas corresponding to the monetary banknote.

Similar to the color lookup table, the pixel lookup table 124 is created by extracting color histogram data for pixels of a valid monetary banknote to be detected. A frequency of occurrence for different values of color histogram data for pixels of the valid monetary banknote is then counted. It is this frequency of occurrences, along with the color histogram data of relevant pixels, which is used to determine a matching pixel.

3. Color Post Processing

Figure 4:
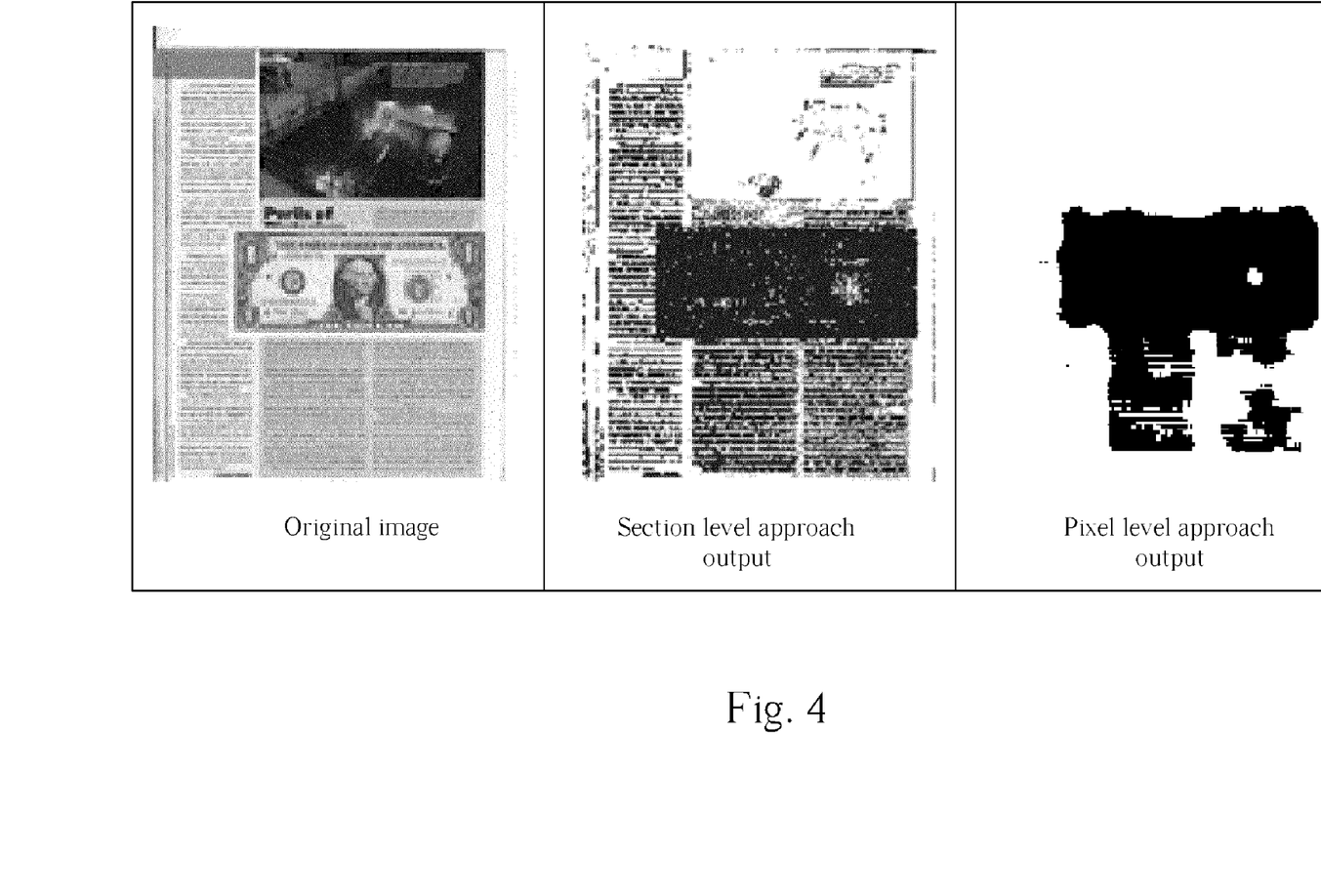
FIG. 4 is an exemplary illustration showing results from various stages of color processing of FIG. 1.
Figure 5:
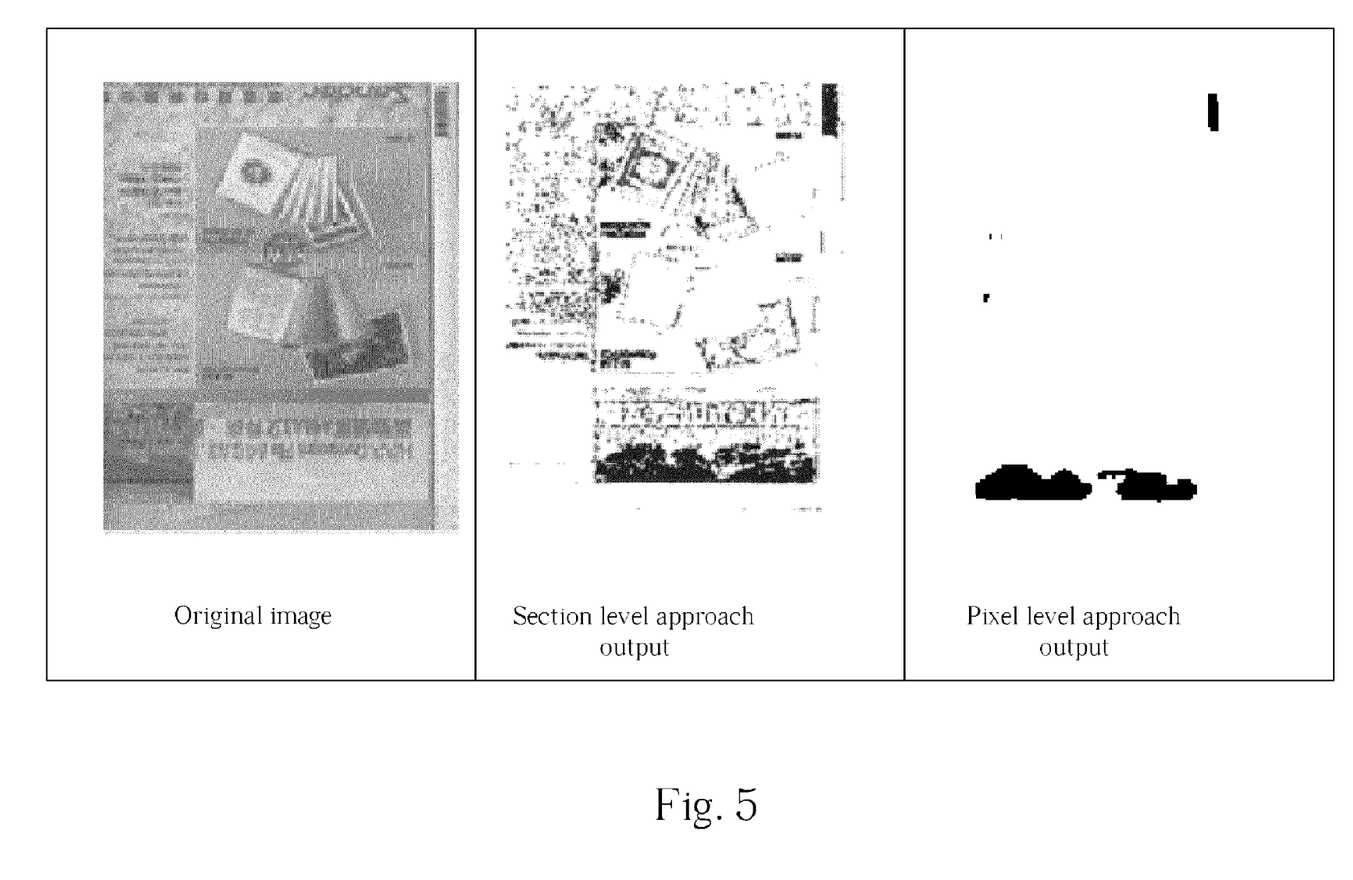
FIG. 5 is another exemplary illustration showing results from various stages of color analysis of FIG. 1.

At this stage of processing, the color process map illustrates probable areas corresponding to the monetary banknote, based on refinements done at a macroscopic section (block) level, and at a microscopic (pixel) level. However, due to uncertainties in image quality, background discrepancies, and noise effects, a roughly tuned color process map is generally produced. An example of this is illustrated through FIG. 4 and FIG. 5. FIG. 4 is an exemplary illustration showing results various stages of color processing. The left hand image is a scan containing a monetary banknote which is desired to be detected. The center image shows the output of the section level approach 110 (identifying bill sections), where the larger area sections are examined for color identification. The right hand image shows the output after the higher resolution, pixel level approach 120, where probable areas are identified in the color process map. Note that although the general area corresponding to the monetary banknote is identified, a considerable amount of noise and background irregularities have been identified as well. Also, there are noticeable holes in bill region and background noise around the bill. FIG. 5 shows another exemplary illustration, using an input scanned image void of the banknote. Note that every successive approach manages to further narrow down potential banknote locations. However, in spite of the absence of the banknote, FIG. 5 shows the pixel level approach output still identifies probable banknote areas, due to noise and background effects, despite an absence of a banknote in the original scanned image.

Figure 6:
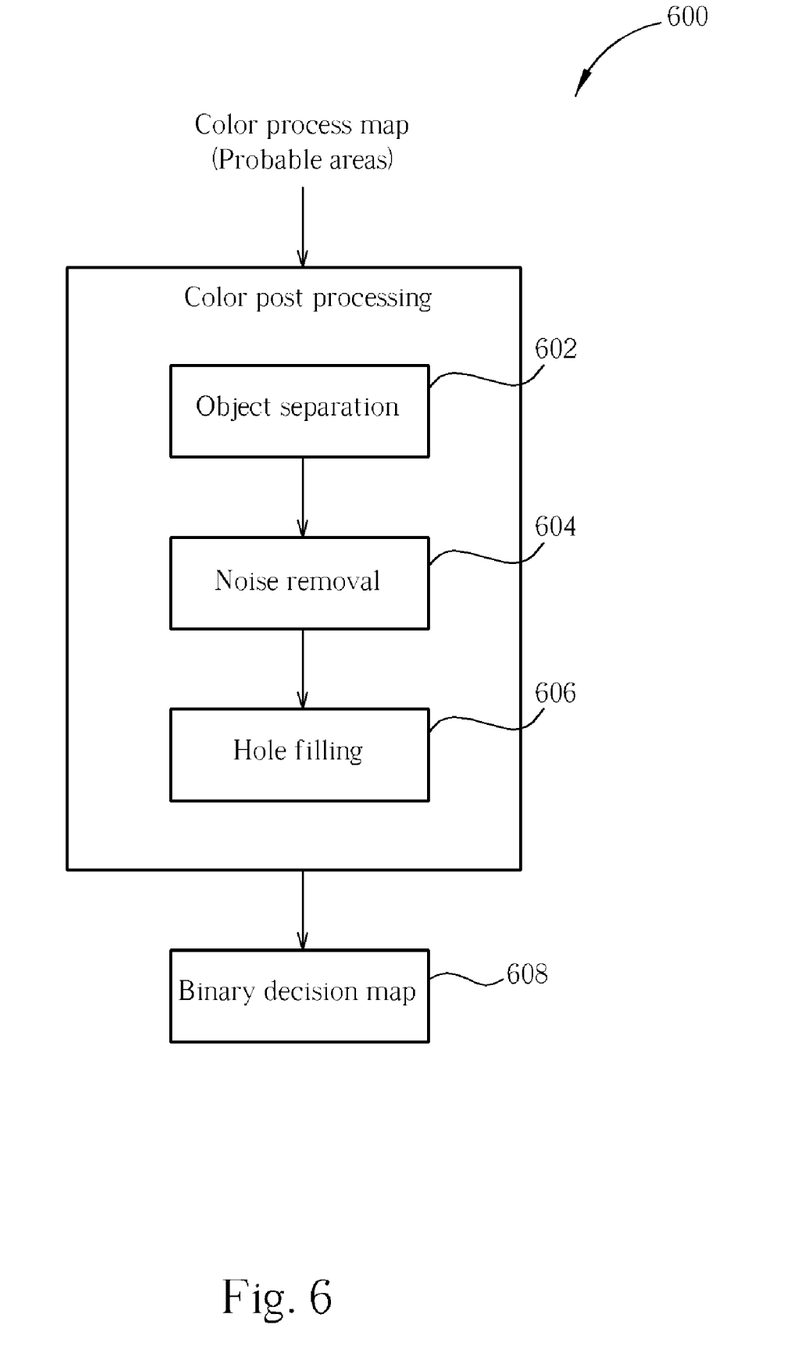
FIG. 6 is a flowchart illustrating a color post processing step for identification of areas within an image that correspond to monetary banknotes according to an exemplary embodiment of the present invention.

In order to "clean up" the background effects and noise associated with the color process map, a further level of color post processing 600 can be applied. This step is illustrated in FIG. 6. As shown in FIG. 6, color post processing 600 comprises object separation 602, noise removal 604, and hole filling 606. Different permutations or order of utilization of these steps may additionally be used throughout different embodiments of the present invention, as long as they do not alter the goals or teachings of the present invention.

All three of these sub steps will be further clarified below.

Object Separation

The first described step of color post processing 600 involves object separation 602. This is performed in order to condition the color process map. Objects are separated using a flood filling algorithm. Although there are many different flood-fill algorithms, one preferred embodiment uses a basic 8-neighbor flood-fill algorithm with 3 iterations. However other embodiments may use other algorithms, bearing that the goals and teachings of the present invention are maintained.

Figure 7:
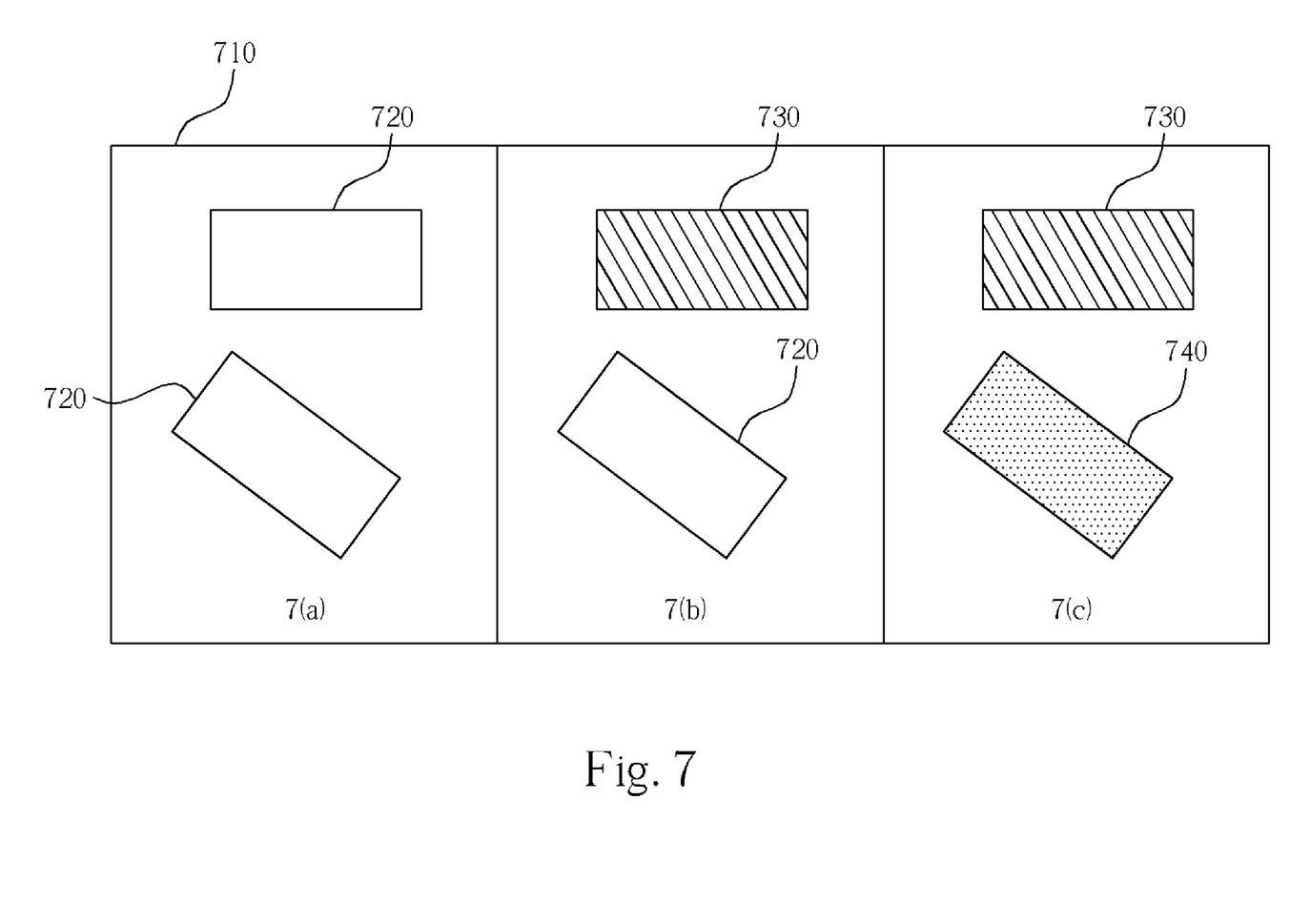
FIG. 7 shows the result of the object separation step of FIG. 6.

An object separation algorithm is first used to label each isolated object in the color processing map. This is illustrated with reference to FIG. 7, showing various stages of the object separation algorithm. Initially, the background is labeled with a first label value 710, as shown in 7(a). An image scan is then performed, in both vertical and horizontal directions. If a block is met (probable area) during the image scan, it is lableled with a second label value 720. As shown in 7(a), two objects are encountered in this step, both being labeled with the second label value 720. Image scanning then continues, however this time, when each object with a second label value 720 is encountered, it is flood filled and then labeled with a new label value. As shown in 7(b), the top object having a second label value has been encountered, and re-labeled with a third label value 730. Each encountered object having a second label value is thus flood filled and re-labeled with an incrementing label value (fourth, fifth . . . etc . . . ) until there are no more remaining objects with the second label value 720. In FIG. 7(c), the bottom object with the second label value has been encountered, and thus re-labeled with the fourth label value 740. When completed, each different object, along with the background, is labeled with a different label value. As illustrated in FIG. 7, there are two identified objects (third label value 730, fourth label value 740) along with the background (first label value 710).

Noise Removal

Noise removal 604 is used to remove noises according to the region area criterion. This step is then performed to reduce background noises surrounding bill areas. As noise removal algorithms are commonly known by those within the art, further discussion will be omitted for brevity.

Hole Filling

Figure 8:
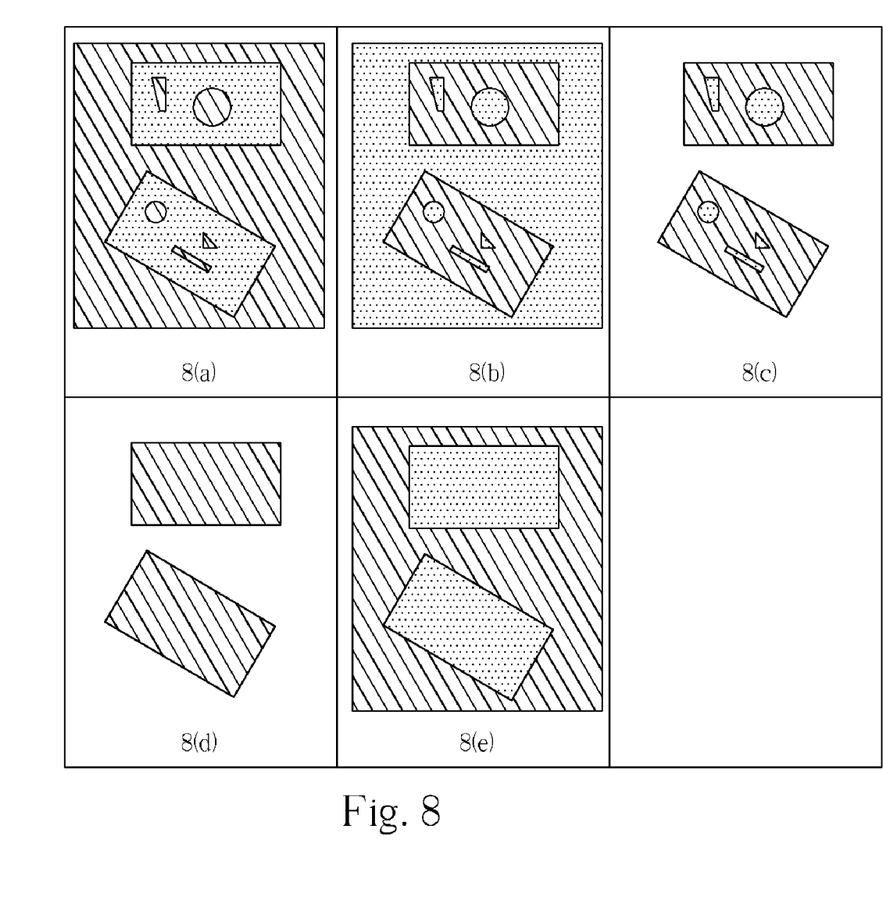
FIG. 8 illustrates the hole filling step of FIG. 6.

Hole filling 606 can then be performed following noise removal 604. A hole-filling algorithm is applied to improve the color process map by ensuring enclosed objects are uniform in value. The hole-filling algorithm is used in conjunction with the flood-filling algorithm, such as that described in object separation 602. Hole filling 606 is illustrated in FIG. 8. From the color process map, probable areas and non-probable areas (background or hole objects) are labeled as a first hole label and a second hole label (identified by dotted and striped colors) respectively, as shown in FIG. 8(a). Then, the hole labels of probable areas and non-probable areas are flipped (ie, striped becomes dotted, and dotted becomes striped) as in FIG. 8(b). The background is then labeled with a third hole label using a flood fill algorithm (indicated by the white color in FIG. 8(c)). The first hole labels, now corresponding to the holes within the probable areas, are then changed to the second hole labels, as shown in FIG. 8(d) to match the probable areas. In this way, the holes are filled. Finally, the second hole labels are changed back to the first hole labels (striped to dotted) to identify probable areas, and the third hole labels are changed to the second hole labels (white to striped) as illustrated in FIG. 8(e).

Therefore, a combination of both flood filling and hole filling is used in order to further refine the color process map and to accurately identify and separate objects, which may correspond to the monetary banknotes.

Figure 9:
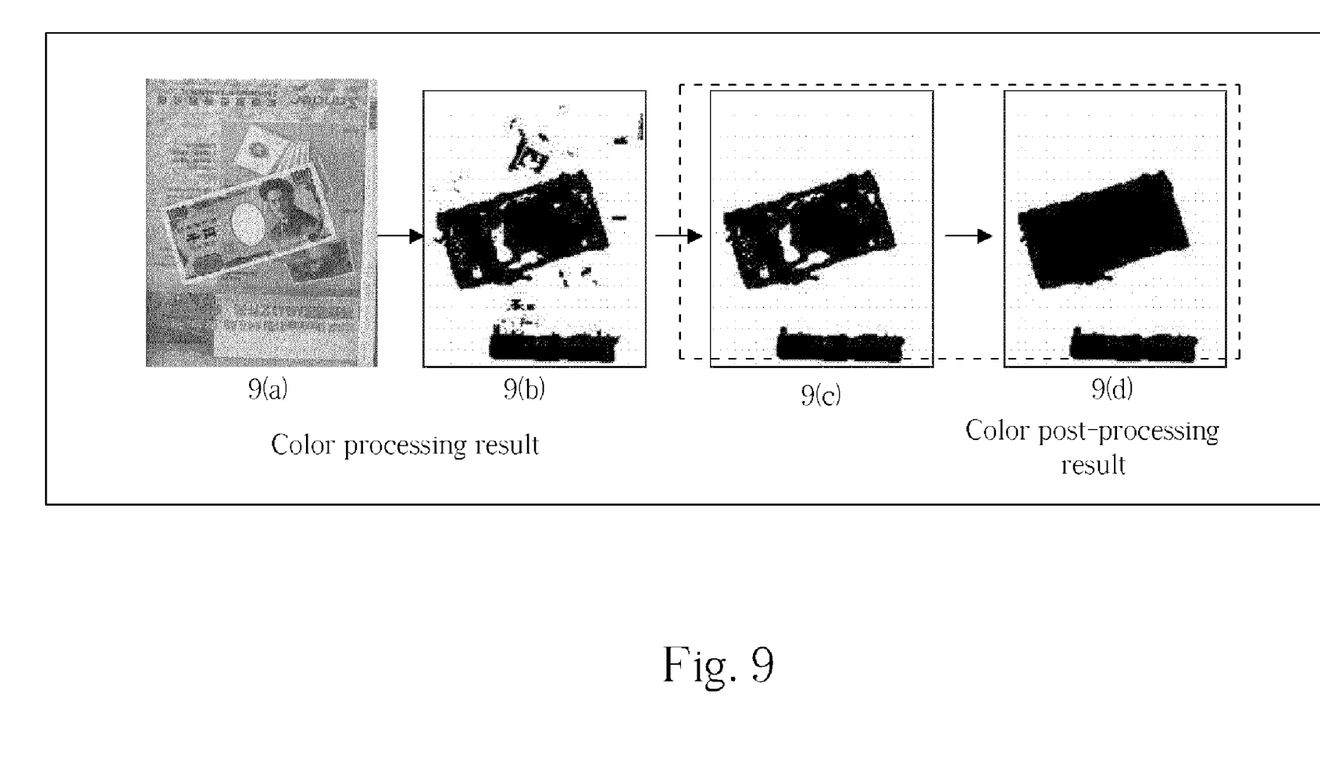
FIG. 9 illustrates various stages of a color processing method applied to an image containing a monetary banknote according to an exemplary embodiment of the present invention.

FIG. 9 illustrates various stages of the color processing method applied to an image containing a monetary banknote. The original image in 9(a) includes the monetary banknote to be detected, imposed onto a background image. Upon performing a section level approach 110 and pixel level approach 120, the area corresponding to the monetary banknote is roughly identified in 9(b) in the color process map. However there appears to be excess noise from the background image, as well as holes within certain areas of the banknote. Color post processing 600 is then applied to further clarify the color process map, including object separation 602 in 9(c), and hole filling 604 in 9(d). The resulting image can then be recorded onto a binary decision map to clearly define areas corresponding to the monetary banknote.

Figure 10:
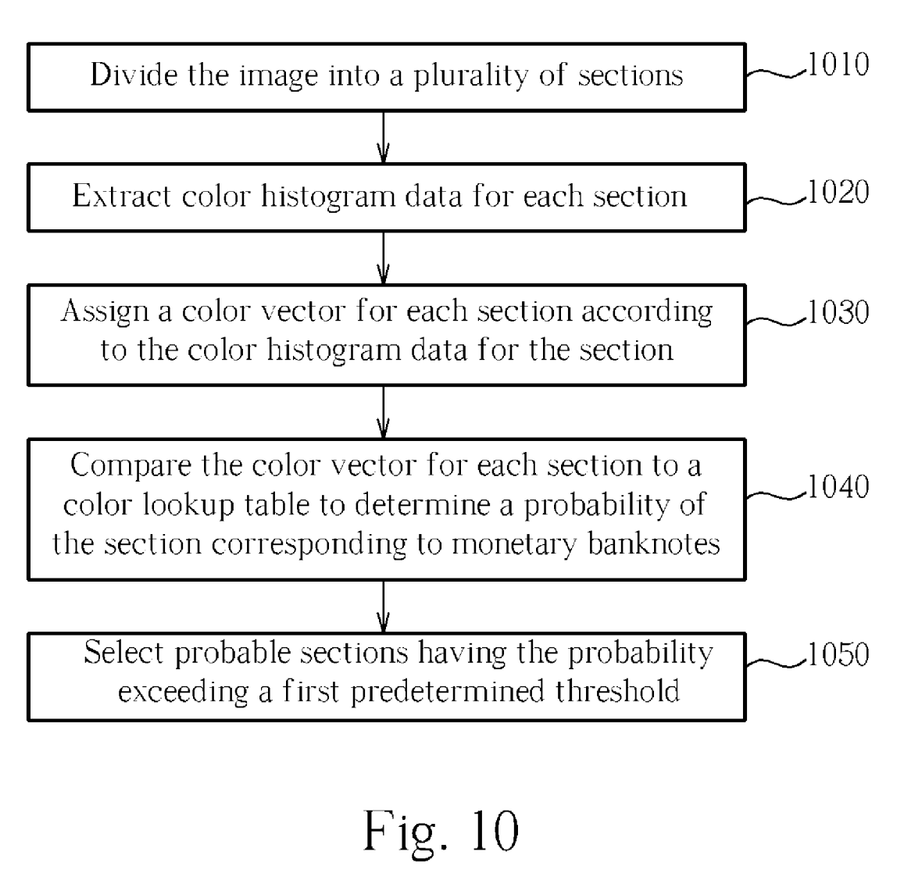
FIG. 10 is a process flow chart summarizing a color processing method for identification of areas within an image corresponding to monetary banknotes according to an exemplary embodiment of the present invention.

FIG. 10 is a process flow chart summarizing a color processing method for identification of areas within an image corresponding to monetary banknotes, according to an exemplary embodiment of the present invention. Provided that substantially the same result is achieved, the steps of process 1000 need not be in the exact order shown and need not be contiguous, that is, other steps can be intermediate. The method comprises:

Step 1010: Divide the image into a plurality of sections.
Step 1020: Extract color histogram data for each section.
Step 1030: Assign a color vector for each section according to the color histogram data for the section.
Step 1040: Compare the color vector for each section to a color lookup table to determine a probability of the section corresponding to monetary banknotes.
Step 1050: Select probable sections having the probability exceeding a first predetermined threshold.

Using the above-described embodiment, the present invention provides a color processing technique for identification of areas within an image corresponding to monetary banknotes. This method can be applied for use in the detection of counterfeit currency, and is indifferent to images with arbitrary rotation and shift alignments. Additionally, the image can contain the monetary banknote while superimposed onto an arbitrary background, and can include multiple isolated or independent banknotes, or have overlapping banknotes within the image. Through the multistage process described above, the method manages to isolate different banknotes and background images to provide a clear concise mapping corresponding to the location of a desired banknote within a scanned image. A highly accurate detection rate can be achieved, while also being robust and flexible enough in application to different image types and conditions.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A color processing method used by a hardware imaging device for identification of areas within an image corresponding to monetary banknotes, the method comprising:
   scanning at least one monetary banknote to create an image corresponding to the monetary banknote by utilizing the hardware imaging device;
   dividing the image into a plurality of sections overlapping with each other;
   extracting color histogram data for each section;
   assigning a color vector for each section according to the color histogram data for the section;
   creating a color lookup table by dividing an image of a valid monetary banknote into a number of sections;
   comparing the color vector for each section to the color lookup table to determine a probability of the section corresponding to monetary banknotes; and
   selecting probable sections having the probability exceeding a first predetermined threshold.

2. The color processing method of claim 1 further comprising:
   comparing color vectors of surrounding sections for each probable section to the color lookup table;
   determining an average probability of the surrounding sections corresponding to monetary banknotes;
   selecting bill sections from the probable sections, the bill sections having surrounding sections with the average probability being greater than a second predetermined threshold;
   comparing pixels contained within the bill sections with a pixel lookup table to determine matching pixels; and
   recording the location of the matching pixels on a color process map as probable areas corresponding to the monetary banknotes.

3. The color processing method of claim 2 further comprising:
   separating objects in the color process map through a flood-fill algorithm;
   removing noise in the color process map according to a noise removal algorithm;
   applying a hole-filling algorithm to ensure a uniform value within enclosed objects; and
   recording the modified color process map onto a binary decision map.

4. The color processing method of claim 2, wherein the surrounding sections form a circumference outside of each probable section.

5. The color processing method of claim 2 further comprising determining the average probability of the surrounding sections corresponding to monetary banknotes according to a frequency of occurrence of the color vectors of the surrounding sections in the lookup table.

6. The color processing method of claim 2 further comprising creating the pixel lookup table by extracting color histogram data for pixels of a valid monetary banknote, and counting a frequency of occurrence for different values of color histogram data for the pixels of the valid monetary banknote.

7. The color processing method of claim 2 further comprising determining the matching pixels according to a frequency of occurrence of the color histogram data of pixels in the pixel lookup table.

8. The color processing method of claim 1, wherein the plurality of sections are a plurality of blocks.

9. The color processing method of claim 1, wherein the color histogram data is red green blue (RGB) color histogram data.

10. The color processing method of claim 1 wherein extracting the color histogram data for each section further comprises extracting a width of a color histogram for a first color, a median value of the color histogram for the first color, a width of a color histogram for a second color, a median value of the color histogram for the second color, a width of a color histogram for a third color, and a median value of the color histogram for the third color.

11. The color processing method of claim 10, wherein the color vector for each section is defined according to the color histogram data through a six dimensional space, the six dimensional space comprising the width of the first color, the width of the second color, the width of the third color, the median value of the first color, the median value of the first color minus the median value of the second color, and the median value of the first color minus the median value of the third color.

12. The color processing method of claim 1 further comprising extracting color histogram data for each section of the valid monetary banknote, assigning a color vector for each section of the valid monetary banknote according to the color histogram data for the section of the valid monetary banknote, and counting a frequency of occurrence of each assigned color vector of the valid monetary banknote.

13. The color processing method of claim 12 further comprising determining the probability of the section corresponding to monetary banknotes according to the frequency of occurrence in the lookup table.

14. The color processing method of claim 1 wherein the monetary banknotes are of a United States of America currency.

15. The color processing method of claim 1 wherein the monetary banknotes are of a Japanese currency.

16. A color processing method used by a hardware imaging device for identification of areas within an image corresponding to monetary banknotes, the method comprising:

scanning at least one monetary banknote to create an image corresponding to the monetary banknote by utilizing the hardware imaging device;

dividing the image into a plurality of sections overlapping with each other;

extracting color histogram data for each section;

assigning a color vector for each section according to the color histogram data for the section;

comparing the color vector for each section to a color lookup table to determine a probability of the section corresponding to monetary banknotes; and selecting probable sections having the probability exceeding a first predetermined threshold.

17. The color processing method of claim 16, further comprising:

comparing color vectors of surrounding sections for each probable section to the color lookup table;

determining an average probability of the surrounding sections corresponding to monetary banknotes;

selecting bill sections from the probable sections, the bill sections having surrounding sections with the average probability being greater than a second predetermined threshold;

comparing pixels contained within the bill sections with a pixel lookup table to determine matching pixels; and recording the location of the matching pixels on a color process map as probable areas corresponding to the monetary banknotes.

18. The color processing method of claim 17, further comprising:

separating objects in the color process map through a flood-fill algorithm;

removing noise in the color process map according to a noise removal algorithm;

applying a hole-filling algorithm to ensure a uniform value within enclosed objects; and recording the modified color process map onto a binary decision map.

19. The color processing method of claim 16 further comprising creating the color lookup table by dividing an image of a valid monetary banknote into a number of sections, extracting color histogram data for each section of the valid monetary banknote, assigning a color vector for each section of the valid monetary banknote according to the color histogram data for the section of the valid monetary banknote, and counting a frequency of occurrence of each assigned color vector of the valid monetary banknote.

20. The color processing method of claim 19 further comprising determining the probability of the section corresponding to monetary banknotes according to the frequency of occurrence in the lookup table.

* * * * *